United States Patent [19]

Maria de Kort et al.

[11] Patent Number: 4,957,766
[45] Date of Patent: Sep. 18, 1990

[54] PROCESS FOR MAKING BEER CONTAINING AN UNFERMENTED BEER PRODUCT

[75] Inventors: Adrianus H. Maria de Kort, Uithoorn; Paul van Eerde, Zoetermeer, both of Netherlands

[73] Assignee: Heineken Technisch Beheer B.V., Amsterdam, Netherlands

[21] Appl. No.: 241,077

[22] Filed: Sep. 6, 1988

[30] Foreign Application Priority Data

Sep. 8, 1987 [NL] Netherlands ................ 8702125
Sep. 24, 1987 [NL] Netherlands ................ 8702279

[51] Int. Cl.⁵ .............................................. C12G 3/08
[52] U.S. Cl. ........................................ 426/592; 426/16; 426/29; 426/64
[58] Field of Search .................. 426/592, 16, 29, 64

[56] References Cited

U.S. PATENT DOCUMENTS

| | | | |
|---|---|---|---|
| 1,152,415 | 9/1915 | Hinterlach | 426/592 |
| 2,440,276 | 4/1948 | Klein | 426/16 |
| 3,113,029 | 12/1963 | Krender et al. | |
| 3,130,055 | 4/1964 | Segel | 426/16 |
| 3,149,052 | 9/1964 | Kneen | 426/16 |
| 3,594,179 | 7/1971 | Korolev | 426/29 |
| 3,875,303 | 4/1975 | Hieber | 426/16 |
| 4,004,034 | 1/1977 | Delhaye | 426/29 |
| 4,305,963 | 12/1981 | Nakagawa | 426/16 |
| 4,622,224 | 11/1986 | Owades | 426/18 |
| 4,661,355 | 4/1987 | Schur | 426/16 |
| 4,746,518 | 5/1988 | Schur | 426/16 |

FOREIGN PATENT DOCUMENTS 1263662 3/1968 Fed. Rep. of Germany.
2145298 3/1973 Fed. Rep. of Germany.
6805092 10/1969 Netherlands.
15533 of 1914 United Kingdom.

OTHER PUBLICATIONS

Bender, 1960, Dictionary of Nutrition and Food Technology, Academic Press, New York, p. 16.

Primary Examiner—Carolyn Paden
Attorney, Agent, or Firm—Amster, Rotherstein & Ebenstein

[57] ABSTRACT

The invention relates to a beer having an alcohol content of maximally 3.5% by volume. For obtaining a beer of this type having good flavor properties, the invention is characterized in that the beer is a mixture of beer obtained by conventional fermentation and unfermented wort product reconstituted with water.

27 Claims, No Drawings

PROCESS FOR MAKING BEER CONTAINING AN UNFERMENTED BEER PRODUCT

BACKGROUND OF THE INVENTION

This invention relates to non-alcoholic, or low-alcohol beer, i.e. beer having an alcohol content of maximally 3.5% by volume. In the past, much attention has already been paid to the preparation of beer having a reduced alcohol content. A summary of a number of principles and methods of brewing such beers can be found in "The Low Alcohol Revolution", Brewers Guardian, March 1987, pp. 16-18.

According to the publication in Brewers Guardian, there are basically three main groups of methods of obtaining beer having a low alcohol content:
1. restriction of the alcohol production during brewing;
2. removal of alcohol after fermentation, and
3. mixing normal beer with other products.

All these methods have the drawback that beers are obtained that lack the specific taste and aroma characteristics inherent in beer. Moreover, there are often off-flavours. A number of methods, and in particular those based on the removal of alcohol after fermentation, have the drawback that a substantial amount of the aroma is lost. The taste of the beer is so to say "empty". In a number of other methods, such as the application of a very short fermentation, or the mixing of normal beer with wort, there is the problem that the beer retains a typically wortlike flavour. U.S. Pat. No. 4,305,963 indicates for instance that, before fermentation, a wort has a greenish flavour. For that reason it is not used directly for the manufacture of beverages, with the exception of malt beverages on the basis of milk.

SUMMARY OF THE INVENTION

The present application relates to a beer having an alcohol content of maximally 3.5%, characterized according to the present invention in that it is a mixture of beer obtained by means of a conventional fermentation and unfermented wort product reconstituted with water.

The beer according to the present invention preferably consists of reconstituted wort product mixed with 5-90% by weight of beer obtained by conventional fermentation, and 0-5% by weight of other additives.

It has surprisingly been found that a beer having a reduced alcohol content and composed as described above, has a good beer flavour, and on the other hand lacks the known, disadvantageous wort smell and taste.

The beer according to the present invention may also contain added flavorants, foam stabilizers, coloring agents, carbon dioxide and/or pH adjusting agent.

The unfermented, water-reconstituted wort product employed according to the present invention for obtaining beer having a reduced alcohol content can be obtained by diluting a wort concentrate with water, e.g. a wort concentrate having a dry matter content of 50-90% by weight. When the water content of the wort concentrate is too high, it is found that the beer according to the present invention still has a slightly wortlike taste. This may be compensated by the addition of a larger amount of beer obtained by conventional fermentation.

Naturally, this is accompanied by an increase in alcohol content in the final product. Consequently, it is only preferred to use a wort concentrate or a diluted wort concentrate when a beer having an alcohol content of 1.5-3.5% by volume is aimed at.

Another possibility of obtaining the reconstituted wort product is the dissolution of wort powder followed by the filtration of this product. The application of a wort powder results in a beer having comparatively the best taste, so that a comparatively small quantity of beer obtained by conventional fermentation will be sufficient. The use of wort powder is accordingly preferred when a beer having an alcohol content ranging between 0.1, more in particular 0.5 and 1.5% by volume, is aimed at. There are a number of possibilities of preparing wort powder. In general, the starting point is a wort concentrate that is processed in a manner similar to malt powder, to a product having a water content not exceeding about 5% by weight. This may be done by drying on a heated roller. The preferred method of obtaining wort powder, however, is spray-drying a wort concentrate. The resulting wort powder provides a beer, after reconstitution with water to the desired dry matter content and mixing with conventional beer, which has the optimal flavour properties. The beer has a very full flavour and lacks the emptiness of conventional low-alcohol beer, or the wortlike flavour inherent in certain other types of low-alcohol beers.

The beer according to the present invention is made preferably by mixing reconstituted wort product having a dry matter content of 2.5 to 6% by weight with beer obtained by conventional fermentation. Likewise, the desired other additives can be admixed therewith, such as flavorants, coloring agents, foam stabilizers, pH adjusting agent and carbon dioxide. The resulting product can then be filtered and bottled, preceded or followed by pasteurization.

The raw materials used for the beer according to the present invention are known per se products. Wort concentrate and wort powder are commercially available products and can be made in the manners described in the literature, e.g. by vacuum-evaporation or spray-drying. The beer obtained by conventional fermentation, likewise employed according to the present invention, is naturally also a known product. This beer has an alcohol content ranging from about 3.5% by volume to values of about 8% by volume. These beers can be classified in bottom-fermented, top-fermented and wheat beers. Examples are Munich beer, Dortmund beer, Pilsener beer, Lager, Märzen (also called Vienna or Spezial)beer, Bock, Doppelbock, Saisons, Trappist, Düsseldorfer Alt, Kölsch, brown beer, Ale (mild or bitter), stout (bitter, mild), Russian beer, Scotch ales, steam beer, Süddeutsches Weizen, Berliner Weisse, Geuze Lambik and Belgian white beer. Naturally, this is only an enumeration of some of the many types of beer to be used in the application of the invention.

According to the present invention, it is also possible to use a beer having reduced alcohol content as the type of beer obtained by means of conventional fermentation. This applies especially to the types of beer for which special measures had to be taken for obtaining a low alcohol content, such as the removal of alcohol by distillation, reverse osmosis, pervaporation, supercritical extraction and the like, thereby obtaining a product which, depending upon the alcohol content of the beer obtained through conventional fermentation, is either entirely non-alcoholic, or has a particular low alcohol content.

In this connection, it is observed that the term beer, as used herein and in the claims, as well as the terms beer of reduced alcohol content, low-alcohol beer or non-alcoholic beer, need not necessarily meet the definitions applying in the various countries. These terms are only used to designate a product having an alcohol content of maximally 3.5% by volume and consisting of the components that should be minimally contained therein according to the present invention.

DESCRIPTION OF THE PREFERRED EMBODIMENTS

The present invention is illustrated in and by the following examples, which should not be construed as limiting the invention in any way.

EXAMPLES I–III

Three types of low-alcohol beer with 0.5, 2.0 and 3.5% by volume of alcohol, respectively, were prepared, starting from the components contained in the Tables. The respective components were admixed with each other, the liquid was filtered and carbonated.

The wort powder employed had been obtained by concentrating and spray-drying a Pilsener wort having a higher bitterness and color than normal Pilsener wort.

EXAMPLE I

TABLE A

| | |
|---|---|
| Wort powder (100% dry matter) | 3.6 kg |
| Pilsener beer, neutral type (Ew = 4.0% by weight; alcohol = 5.0% by volume) | 10.0 l |
| Lactic acid solution (10% by weight) | 90.0 ml |
| Water | made up to 100 l |

There was thus obtained a neutral Pilsener type of beer of good taste and having no off-flavour, with 0.5% by volume of alcohol.

The analysis results of this beer were:

| | | |
|---|---|---|
| real extract | 4.0% | by weight |
| colour | 7.0 | EBC |
| bitterness | 20.0 | EBE |

EXAMPLE II

TABLE B

| | |
|---|---|
| Wort powder (100% dry matter) | 2.4 kg |
| Pilsener beer, ester type (Ew = 4.0% by weight, alcohol = 5.0% by volume) | 40.0 l |
| Lactic acid solution (10% by weight) | 60.0 ml |
| Water | made up to 100 l |

There was thus obtained an ester type Pilsener beer of good taste and having no off-flavours, 4.0% by weight real extract, 2.0% by volume of alcohol, 7.0 EBC and 20.0 EBE.

EXAMPLE III

TABLE C

| | |
|---|---|
| Wort powder (100% dry matter) | 1.2 kg |
| Pilsener beer, hoppy type (Ew = 4.0% by weight, 5.0% by volume of alcohol) | 70.0 l |
| Lactic acid solution (10% by weight) | 30.0 ml |
| Water | made up to 100 l |

There was thus obtained a hoppy Pilsener beer with 3.5% by volume of alcohol, 4.0% by weight real extract, 7.0 EBC and 20.0 EBE.

EXAMPLE IV

TABLE D

| | |
|---|---|
| Wort powder (100% dry matter) | 2 kg |
| Stout beer, neutral type (Ew = 4.6% by weight, 4.5% by volume of alcohol) | 56 l |
| Lactic acid solution (10% by weight) | 25 ml |
| Water | made up to 100 l |

There was thus obtained a neutral stout type of beer of good taste without off-flavours and having 2.5% by volume of alcohol, 120 EBC and 40 EBE.

I claim:

1. Beer having an alcohol content of maximally 3.5% by volume, characterized in that it is a mixture devoid of green flavor of (A) beer obtained by means of a conventional fermentation and (B) unfermented wort product reconstituted with water, said wort product prior to reconstitution having a dry matter content of at least 50% by weight.

2. Beer as claimed in claim 1, characterized in that it contains 10–95% by weight of reconstituted wort product, 5–90% by weight of conventionally fermented beer, and 0–5% by weight of other additives.

3. Beer as claimed in claim 1, characterized in that it contains added a flavorant, foam stabilizers, carbon dioxide, coloring agent or pH adjusting agent.

4. Beer as claimed in claim 1, characterized in that the wort product reconstituted with water is a wort concentrate which has subsequently been diluted with water.

5. Beer as claimed in claim 4, characterized in that it has an alcohol content of 1.5–3.5% by volume.

6. Beer as claimed in claim 4, characterized in that said wort concentrate, prior to being diluted, has a water content not exceeding about 5% by weight.

7. Beer as claimed in claim 1, characterized in that the reconstituted wort product is a wort powder dissolved in water.

8. Beer as claimed in claim 7, characterized in that the wort powder has been spray-dried.

9. Beer as claimed in claim 7, characterized in that it has an alcohol content of 0.1–1.5% by volume.

10. Beer as claimed in claim 7, characterized in that said wort powder, prior to dissolution, has a dry matter content of about 100% by weight.

11. Beer as claimed in claim 1, characterized in that the reconstituted wort product has a dry matter content of 2.5–6% by weight.

12. Beer as claimed in claim 1, characterized in that the conventionally fermented beer is a top-fermented, bottom-fermented or wheat beer.

13. A process for preparing beer having an alcohol content of maximally 3.5% by volume, comprising the steps of:
(A) providing beer obtained by means of a conventional fermentation;
(B) providing an unfermented wort product having a dried matter content of at least 50% by weight;
(C) reconstituting the unfermented wort product with water; and
(D) mixing the reconstituted wort product and the beer in an appropriate ratio to provide a beer having an alcohol content of maximally 3.5% by volume.

14. The process as claimed in claim 13, characterized in that the mixture contains 10–95% by weight of reconstituted wort product, 5–90% by weight of conventionally fermented beer, and 0–5% by weight of other additives.

15. The process as claimed in claim 13, characterized in that a flavorant, foam stabilizer, carbon dioxide, coloring agent or pH adjusting agent is added to the mixture.

16. The process as claimed in claim 13, characterized in that the wort product reconstituted with water is a wort concentrate which has subsequently been diluted with water.

17. The process as claimed in claim 16, characterized in that the mixture has an alcohol content of 1.5–3.5% by volume.

18. The process as claimed in claim 16 wherein the wort concentrate, prior to being diluted, has a water content not exceeding about 5% by weight.

19. The process as claimed in claim 13, characterized in that the reconstituted wort product is a wort powder dissolved in water.

20. The process as claimed in claim 19, characterized in that the wort powder has been spray-dried.

21. The process as claimed in claim 19, characterized in that the mixture has an alcohol content of 0.1–1.5% by volume.

22. The process as claimed in claim 19 wherein the wort powder, prior to dissolution, has a dry matter content of about 100% by weight.

23. The process as claimed in claim 13, characterized in that the reconstituted wort product has a dry matter content of 2.5–6% by weight.

24. The process as claimed in claim 13, characterized in that the conventionally fermented beer is a top-fermented, bottom-fermented or wheat beer.

25. The process as claimed in claim 13, characterized by the mixture having an absence of green flavor.

26. Beer having an alcohol content of maximally 3.5% by volume made by the process of claim 13.

27. A process for preparing beer having an alcohol content of maximally 3.5% by volume, comprising the steps of:
   (A) providing beer selected from top-fermented, bottom-fermented or wheat beers obtained by means of a conventional fermentation;
   (B) providing an unfermented spray-dried wort powder having a dried matter content of about 100% by weight;
   (C) reconstituting the unfermented wort powder with water, the reconstituted wort product having a dry matter content of 2.5–6% by weight; and
   (D) mixing the reconstituted wort product and the beer in an appropriate ratio to provide a beer having an alcohol content of maximally 3.5% by volume and characterized by an absence of green flavor, the mixture containing 10–95% by weight of reconstituted wort product, 5–90% by weight of conventionally fermented beer, and 0–5% by weight of other additives selected from a flavorant, foam stabilizer, carbon dioxide, coloring agent, pH adjusting agent and mixtures thereof.

* * * * *

UNITED STATES PATENT AND TRADEMARK OFFICE
CERTIFICATE OF CORRECTION

PATENT NO.   :   4,957,766
DATED        :   September 18, 1990
INVENTOR(S)  :   Adrianus H. Maria de Kort, et al.

It is certified that error appears in the above-identified patent and that said Letters Patent is hereby corrected as shown below:

On the title page and Item [19]

Name of inventors in header - Delete "Maria"

Signed and Sealed this

Twenty-second Day of September, 1992

Attest:

DOUGLAS B. COMER

*Attesting Officer*     *Acting Commissioner of Patents and Trademarks*